J. W. DREW.
PISTON ROD PACKING.
APPLICATION FILED FEB. 8, 1919.

1,310,983.

Patented July 22, 1919.

Inventor
John W. Drew

UNITED STATES PATENT OFFICE.

JOHN W. DREW, OF ST. LOUIS, MISSOURI, ASSIGNOR TO MOON BROTHERS MANUFACTURING COMPANY, OF ST. LOUIS, MISSOURI, A CORPORATION OF MISSOURI.

PISTON-ROD PACKING.

1,310,983.      Specification of Letters Patent.      Patented July 22, 1919.

Application filed February 8, 1919. Serial No. 275,739.

*To all whom it may concern:*

Be it known that I, JOHN W. DREW, a citizen of the United States, residing at the city of St. Louis, State of Missouri, have invented a certain new and useful Improvement in Piston-Rod Packings, of which the following is a full, clear, and exact description, such as will enable others skilled in the art to which it appertains to make and use the same, reference being had to the accompanying drawings, forming part of this specification, in which—

Figure 2:
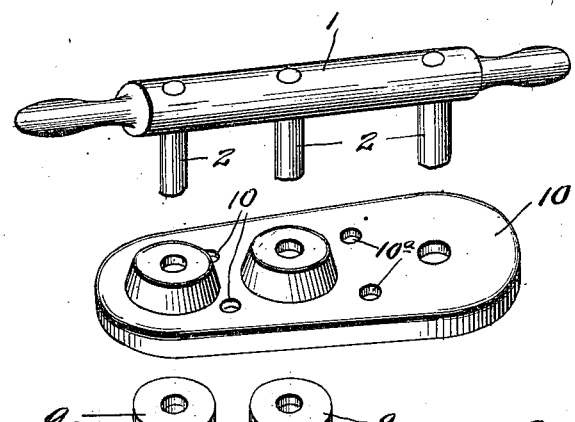
Fig. 2 is a cross sectional view through the upper end of one of the cylinders.
Figure 2:
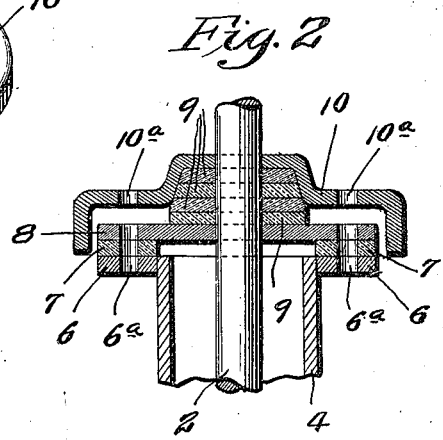

This invention relates to a new and useful improvement in piston rod packings designed especially for triple cylinder pumps, such as are used in inflating automobile tires, etc.

The object of my invention is to simplify piston rod packings for pumps of this character whereby they are easily assembled, cheap to manufacture, and are efficient in operation.

In the drawings, 1 indicates the handle of the pump and 2 the piston rods connected thereto. These piston rods carry piston heads at their lower ends, not shown, which operate in cylinders 3, 4, and 5. These cylinders are of gradually decreasing diameters in order to effect a stage compression of the air.

6 indicates a flange plate preferably pressed from metal and soldered or otherwise secured to the upper end of cylinders 4 and 5, said flange plate having openings 6ª therein for the reception of fastening devices hereinafter referred to.

Figure 1:
Figure 1 is a detail view showing the parts detached of my improved piston rod packing for triple cylinder pumps.
Figure 1:
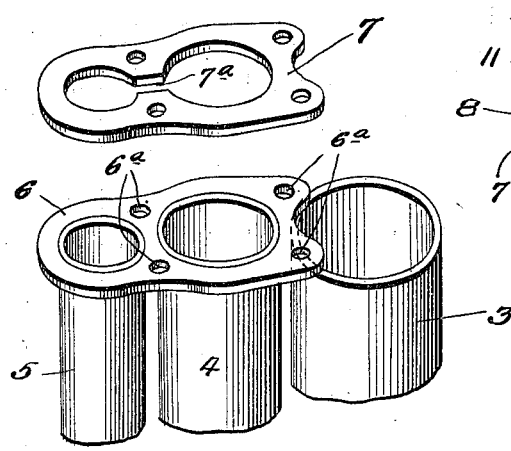
Figure 3:
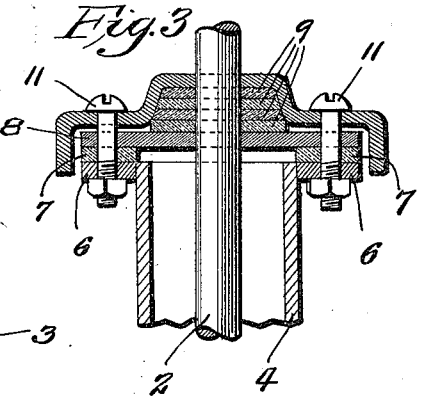
Fig. 3 is a similar view showing the cap piece clamped to its final adjusted position.
Figure 4:
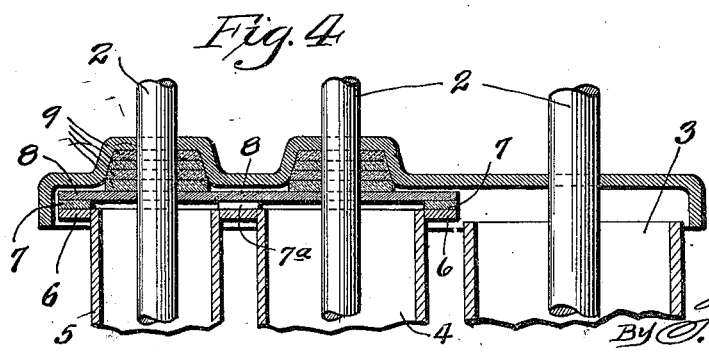
Fig. 4 is a similar view taken at right angles to Fig. 3.

7 Indicates a packing washer preferably formed of leather, blotting paper, or the like and which may be stamped by the use of the same dies employed in the production of the flange plate 6, and opening 7ª being afterward formed by cutting out the material as shown in Fig. 1, this opening establishing communication between the upper ends of the chambers of the medium and smaller size cylinders 4 and 5, respectively.

This washer 7 is designed to be interposed between the flange plate 6 and a metallic plate 8, the latter being shaped similar to the plate and washer with the exception that the openings through which the piston rods pass are reduced in size so as to snugly fit the piston rods but permit of their easy movement therethrough.

9 indicates a plurality of packing washers, preferably made of leather which are strung on the piston rods operating in cylinders 4 and 5 and which rest upon the metallic plate 8. 10 is a cap piece preferably provided with marginal depending flanges, said cap piece being of such size and shape as to embrace the upper ends of all three cylinders. This cap piece is preferably pressed from sheet metal and is provided with recesses opening through its under side, the walls of said recesses being circular and tapered, following substantially the shape of a frustum of a cone. The top wall of each recess is preferably flat and provided with an opening for the passage of the piston rod. The largest diameter of this tapered recess is substantially the same as the diameter of the packing washers 9.

Bolts or screws 11 pass through openings 10ª in the cap piece and into or through openings 6ª of the flange plate, whereby the cap piece may be clamped in position.

When the parts are first assembled, the washers 9, when originally forced into the tapered recess, are liable to buckle slightly and to compensate for this an extra take-up washer is employed, as shown in Fig. 2.

As the washers 9 are worn by the movement of the piston, the washers will adjust themselves and in assuming a flattened position, automatically take up such wear. Further wearing of the washers can be taken up by clamping the cap piece down more tightly, thus crowding the washers 9 against the piston rods.

To renew the washers 9 it is only necessary to remove the cap piece, take away the old washers and substitute the new; this can be done without disturbing the washer 7 which, not being subject to wear from any moving parts, should outlive the washer 9.

It will be readily understood that minor changes in the size, form and construction of the various parts of my improved piston rod packing may be made and substituted for those herein shown and described, without departing from the spirit of my invention, the scope of which is set forth in the following claims.

What I claim is:

1. In a piston rod packing for pumps, the combination of a flanged cylinder, of a packing washer superposed upon the flange thereof, a metallic washer for clamping the packing washer against said flange, said metallic washer having an opening designed to snugly fit the piston rod but permit easy movement therethrough, a cap piece having a tapered recess in axial alinement with the cylinder, a plurality of packing washers designed to be crowded into said tapered recess and thereby make a tight joint with the piston rod, and means for adjustably clamping said cap piece in position.

2. In a piston rod packing for pumps, the combination of a flanged cylinder, a metallic plate forming an end wall for said cylinder, a cap piece having a tapered recess in axial alinement with said cylinder, packing washers arranged in said recess and bearing against said plate, and means for clamping the cap plate in position.

3. In a packing for pumps, the combination of a plurality of cylinders, a flange plate secured to two of said cylinders, a packing washer arranged upon said flange plate, a metallic plate arranged upon said packing washer and being provided with openings slightly larger than the piston rods, piston rods operating through said openings, packing washers strung on said piston rods and bearing upon said plate, a cap plate having a marginal flange and provided with tapered recesses for receiving said washers and forcing them inwardly against the piston rods, said cap piece extending over all of the cylinders of the pump, and means for adjustably clamping said cap piece in position.

In testimony whereof I hereunto affix my signature this 5th day of February, 1919.

JOHN W. DREW.

Copies of this patent may be obtained for five cents each, by addressing the "Commissioner of Patents, Washington, D. C."